(12) United States Patent
Zhang et al.

(10) Patent No.: US 11,615,702 B2
(45) Date of Patent: Mar. 28, 2023

(54) DETERMINING VEHICLE PATH

(71) Applicant: Ford Global Technologies, LLC, Dearborn, MI (US)

(72) Inventors: Linjun Zhang, Canton, MI (US); Helen E. Kourous, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 17/017,769

(22) Filed: Sep. 11, 2020

(65) Prior Publication Data

US 2022/0084405 A1  Mar. 17, 2022

(51) Int. Cl.
| | | |
|---|---|---|
| G08G 1/01 | (2006.01) | |
| G08G 1/0967 | (2006.01) | |
| G08G 1/0968 | (2006.01) | |
| B60W 50/00 | (2006.01) | |
| B60W 30/18 | (2012.01) | |

(52) U.S. Cl.
CPC ..... *G08G 1/0141* (2013.01); *B60W 30/18159* (2020.02); *B60W 50/0097* (2013.01); *G08G 1/0116* (2013.01); *G08G 1/096741* (2013.01); *G08G 1/096783* (2013.01); *G08G 1/096822* (2013.01); *B60W 2556/20* (2020.02); *B60W 2756/10* (2020.02)

(58) Field of Classification Search
CPC ............... G08G 1/0141; G08G 1/0116; G08G 1/096741; G08G 1/096783; G08G 1/096822; B60W 30/18159; B60W 50/0097; B60W 2556/20; B60W 2756/10
See application file for complete search history.

(56) References Cited

U.S. PATENT DOCUMENTS

| | | | | |
|---|---|---|---|---|
| 9,248,834 | B1* | 2/2016 | Ferguson | B60W 60/0027 |
| 9,805,601 | B1* | 10/2017 | Fields | G08G 1/096827 |
| 10,235,882 | B1* | 3/2019 | Aoude | G06N 5/046 |
| 10,759,422 | B2* | 9/2020 | You | B60W 30/09 |
| 10,928,820 | B1* | 2/2021 | Tao | B60W 50/0097 |
| 11,112,796 | B2* | 9/2021 | Djuric | B60W 30/00 |
| 11,169,531 | B2* | 11/2021 | Hong | G06K 9/00825 |
| 2011/0006914 | A1* | 1/2011 | Tsuda | H04W 16/30 |
| | | | | 340/905 |
| 2011/0087433 | A1* | 4/2011 | Yester | G08G 1/166 |
| | | | | 701/469 |

(Continued)

*Primary Examiner* — Dale W Hilgendorf

(74) *Attorney, Agent, or Firm* — Frank A. MacKenzie; Bejin Bieneman PLC

(57) ABSTRACT

A system comprising a computer including instructions to collect object data about each of a plurality of objects within a zone from sensors on a roadside infrastructure unit. The zone includes a road intersection. The object data includes an object type, an object location, an object speed and an object direction of travel for each object. The computer further includes instructions to determine, based on the object data, an availability level for execution of one or more paths through the road intersection by a vehicle wherein the availability level for each of the one or more paths is based on a likelihood of interference between any of the objects and the vehicle as the vehicle traverses the respective path. The computer further includes instructions to transmit an availability message to the vehicle including the availability level for each of the one or more paths.

20 Claims, 7 Drawing Sheets

(56) References Cited

U.S. PATENT DOCUMENTS

| | | | |
|---|---|---|---|
| 2015/0268665 A1* | 9/2015 | Ludwick | B60Q 5/008 |
| | | | 701/23 |
| 2015/0310738 A1* | 10/2015 | Karacan | G08G 1/096783 |
| | | | 701/117 |
| 2017/0329332 A1* | 11/2017 | Pilarski | B60W 30/0956 |
| 2018/0063261 A1* | 3/2018 | Moghe | G08G 1/123 |
| 2019/0294966 A1* | 9/2019 | Khan | G06K 9/6267 |
| 2019/0339082 A1 | 11/2019 | Doig et al. | |
| 2020/0004268 A1 | 1/2020 | Park | |
| 2021/0125076 A1* | 4/2021 | Zhang | G06N 3/0454 |
| 2022/0126864 A1* | 4/2022 | Moustafa | B60W 60/0057 |

\* cited by examiner

DETERMINING VEHICLE PATH

BACKGROUND

Vehicle sensors may be unable to detect objects in an environment in which the vehicle is operating, resulting in uncertain operating conditions. For example, a vehicle sensor may not be able to detect an object unless the object is within the field of view of the sensors. Smaller objects may be occluded from view by larger objects. Further, mobile objects may follow unpredictable paths or trajectories, resulting in additional uncertainty.

DETAILED DESCRIPTION

Figure 1:
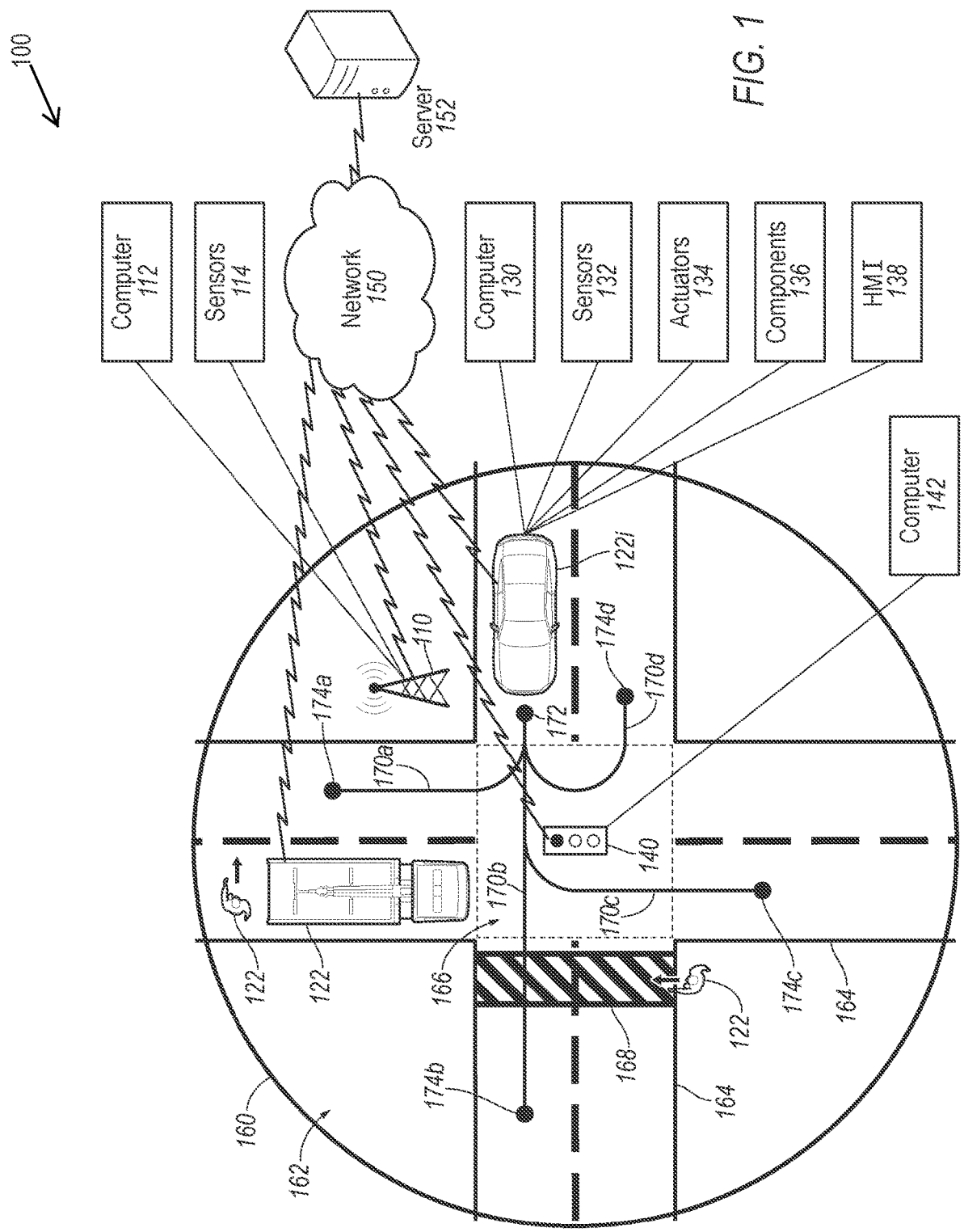
FIG. 1 is a diagram of an example to system for assigning availability levels to paths through an intersection for a vehicle.

Disclosed is a system comprising a computer including a processor and a memory, the memory including instructions executable by the processor. The instructions include instructions to collect object data about each of a plurality of objects within a zone from sensors on a roadside infrastructure unit, wherein the zone includes a road intersection, and the object data includes an object type, an object location, an object speed and an object direction of travel for each respective object. The instructions further include instructions to determine, based on the object data, an availability level for execution of one or more paths through the road intersection by a vehicle wherein the availability level for each of the one or more paths is based on a likelihood of interference between any of the objects and the vehicle as the vehicle traverses the respective path; and transmit an availability message to the vehicle including the availability level for each of the one or more paths.

In the system, the availability level can be selected from a set of availability levels including: a first availability level specifying that there are no interfering objects for the respective path and the vehicle can proceed at nominal speed; a second availability level specifying that there are potentially interfering objects for the respective path and the vehicle can proceed at reduced speed; and a third availability level specifying that there are interfering objects present for the respective path and the vehicle should stop and wait.

In the system, the set of availability levels can further include a fourth availability level specifying that the respective path is closed or blocked and the vehicle should select an alternate path.

In the system, the one or more paths includes one path for each available intersection exit for the vehicle upon entering the road intersection.

The system can further include instructions to estimate respective object paths of the objects based on the object data, wherein determining the availability level is further based on the respective estimated object paths for the objects.

The system can further include instructions to receive signal phase and timing (SPAT) data from a traffic signal operating at the road intersection, wherein determining the availability level is further based on the signal phase and timing data.

The system can further include instructions to receive a basic safety message from at least one of the objects, wherein determining the availability level is further based on second object data included in the basic safety message. In the system, the system second object data includes one or more of the object type, the object location, an object speed or an object direction of travel.

The system can further include instructions to specify an entry point and an exit point for each path.

The system can further include instructions to specify a recommended speed for each path.

The system can further include instructions to determine a respective confidence level for each of the availability levels in the message; and include the respective confidence levels in the message.

The system can further include instructions to identify, based on the object data, respective operating priorities for the objects, wherein specifying the availability level is further based on the respective operating priorities for the objects.

In the system, the object data can further be collected by stationary sensors having a field-of-view including a portion of the zone and that are communicatively coupled with the computer.

Further disclosed is a method comprising: collecting object data about each of a plurality of objects within a zone from sensors on a roadside infrastructure unit, wherein the zone includes a road intersection, and the object data includes an object type, an object location, an object speed and an object direction of travel for each respective object; determining, based on the object data, an availability level for execution of one or more paths through the road intersection by a vehicle wherein the availability level for each of the one or more paths is based on a likelihood of interference between any of the objects and the vehicle as the vehicle traverses the respective path; and transmitting an availability message to the vehicle including the availability level for each of the one or more paths.

In the method, the availability level can be selected from a set of availability levels comprising: a first availability level specifying that there are no interfering objects for the respective path and the vehicle can proceed at nominal speed; a second availability level specifying that there are potentially interfering objects for the respective path and the vehicle can proceed at reduced speed; a third availability level specifying that there are interfering objects present for the respective path and the vehicle should stop and wait; and a fourth availability level specifying that the respective path is closed or blocked and the vehicle should select an alternate path.

In the method, the one or more paths can include one path for each available intersection exit for the vehicle upon entering the road intersection.

The method can further comprise estimating respective object paths of the objects based on the object data, wherein determining the availability level is further based on the respective estimated object paths for the objects.

The method can further comprise receiving signal phase and timing (SPAT) data from a traffic signal operating at the road intersection, wherein determining the availability level is further based on the signal phase and timing data.

The method can further comprise receiving a basic safety message from at least one of the objects, wherein determining the availability level is further based on second object data included in the basic safety message.

Further disclosed is a computing device programmed to execute any of the above method steps.

Further disclosed is a roadside infrastructure unit including a computing device programmed to execute any of the above steps.

A roadside infrastructure unit includes sensors that can collect data about objects such as vehicles, pedestrians, animals, road obstructions, etc., in a zone including an area of potential interference (e.g., an intersection) between the objects. The roadside infrastructure unit may further receive messages from traffic signals and vehicles operating in the zone. Based on the object data and data included in the messages from the traffic signal and vehicles, the roadside infrastructure unit identifies potential paths for each vehicle through the area of potential interference. The roadside infrastructure unit then determines an availability level for the vehicle to traverse respective paths based on the collective data. The availability level is based on a likelihood of interference between the vehicle and any of the other objects (including other vehicles) as the respective vehicle traverses the path. The roadside infrastructure unit further transmits an availability message to the vehicle including each of the paths and their respective availability levels.

FIG. 1 illustrates an example system 100 including a roadside infrastructure unit 110 in a zone 162. The zone 162 includes an intersection 166. The roadside infrastructure unit 110, via sensors 114, can detect objects 122 in the zone 162. As seen in FIG. 1, objects 122 may include one or more vehicles or other objects, such as pedestrians. The roadside infrastructure unit 110 can be programmed to select a vehicle 122$i$ from the objects 122 and determine an availability level for the selected vehicle 122$i$ to traverse one or more paths 170 through the zone 162 and transmit the availability levels to the selected vehicle 122$i$. The roadside infrastructure unit 110 can determine the availability levels based on a likelihood of interference between the selected vehicle 122$i$ and the other objects 122 in the zone 162. In practice, the roadside infrastructure unit 110 can be programmed to select, sequentially, each of the vehicle objects 122 in the zone 162, such that the roadside infrastructure unit 110 can determine an availability level for each potential path 170 for each vehicle object 122 through the zone 162. For example, FIG. 1 illustrates potential paths 170$a$, 170$b$, 170$c$, 170$d$ for the vehicle 122$i$.

The roadside infrastructure unit 110 can further transmit an availability message to the selected vehicle 122$i$. As used herein, an availability message is a message sent via wireless communication from the roadside infrastructure unit 110 to a selected vehicle 122$i$ including specifications of one or more paths for the selected vehicle 122$i$ and an availability level for each of the specified paths. The message may also specify a gated time $t_{gate}$ for which the availability level is valid. A path may be defined by geo-coordinates of an entry point at a beginning of the path, geo-coordinates of an exit point at an end of the path, and a line, curve and/or intermediate points connecting the entry point and the exit point. The geo-coordinates are typically expressed as latitude and longitude coordinates.

The gated time $t_{gate}$, as used herein, is a time after which the specified availability level expires. In an example, the gated time $t_{gate}$ may be calculated as a time $t_{trans}$ of the current transmission plus a gating period $t_{gatper}$. The gating period $t_{gatper}$ may be a fixed time period based on an update time $t_{update}$ between updates of the availability level. For example, the roadside infrastructure unit 110 may be programmed reevaluate and update availability levels for selected vehicles 122$i$ once every update time $t_{update}$. In such as case, the gating period $t_{gatper}$ may be set to be equal to the update time $t_{update}$ or, to allow a margin, set to be equal to the update time $t_{update}$ plus a tolerance such as 10%. For example, the update time $t_{update}$ may be 100 milliseconds (mS) and the gating period $t_{gatper}$ may be 110 mS. The gated time $t_{gate}$ may then be calculated as the time $t_{trans}$ of the current transmission plus the gating period $t_{gatper}$.

An availability level of a path, in the context of this document, is a level selected from a set of levels, described below, that is based on a likelihood of interference between the selected vehicle 122$i$ and other objects 122 as the selected vehicle 122$i$ traverses the path. Based on the availability level, an operator of the selected vehicle 122$i$, which may be a human or a computer-based operator (for vehicles operating in an autonomous or semi-autonomous mode) can adjust operation of the selected vehicle 122$i$. A likelihood of interference between the selected vehicle 122$i$ and other objects 122 along the path is an estimate of a likelihood that another object 122 may be in or will enter the path of the selected vehicle 122$i$ during a time that the selected vehicle 122$i$ requires to traverse the path. As described below, the likelihood that another object 122 may be in or will enter the path of the selected vehicle 122$i$ may be determined based on a type, location, speed and direction of travel of the other objects 122 in the zone 162 at a time that the estimate is calculated. A type of object, as used herein, is a classification or category of objects having common features. A feature of an object herein means a physical attribute of the object such as the shape and size (i.e., dimensions), and external components that can be detected by the sensors 114. External components in this context means physical structures attached to an exterior of the object 122 which can be detected by the sensors 114 and that are themselves recognizable by there shape and size, such as exterior mirrors on a vehicle object 122. When detectable by the sensors 114, e.g., by observation over an amount of time, object features may also include physical attributes, i.e., values, that describe movement of the object, such as the speed, the direction, and the rate of change of the speed and rate of change of direction of the object. Rate of change of speed in this context means a frequency and magnitude of speed variation around a mean speed. Rate of change of direction means in this context a frequency and magnitude of direction variation around a mean direction. For example, a rate of change of speed or direction for a vehicle object 122 having a mass of 1000 Kg will be slower than a rate of change of speed or direction of a bicycle object 122 having a mass of 10 Kg. Further, some objects 122 may have signature movements that may be detectable. For example, a bicycle object 122 may have a rhythmic change in speed related to pedaling of the bicycle object 122. A skateboard object 122 may have a rhythmic change in direction as the user "tacks" back and forth. Such changes in speed and direction may be detected by the sensors 114, and, for example, compared to libraries of signature movements to identify a type of the object 122. An object location, as used herein, is typically provided in a conventional form, e.g., geo-coordinates such as latitude and longitude coordinates.

A likelihood of interference, as used herein, is a probability that the selected vehicle 122$i$ will interfere with operation and/or a path of another object 122 in the zone 162, and/or vice-versa. A likelihood of interference can be expressed on a scale, e.g., one to ten, low, medium and high, etc.

A low likelihood of interference herein means that, along the path of the selected vehicle 122i for an amount of time $T_{path}$ that the selected vehicle 122i will be traversing the path, there are no detected high priority objects 122, interfering objects 122 or potentially interfering objects 122. A high priority object is typically an object 122 that belongs to an object type or category determined to be most desirable for the vehicle 122i to avoid, e.g., one of: (1) a pedestrian, an animal, or personal transportation device (such as a bicycle or scooter) having an object path determined to enter the selected vehicle 122i path 170 within the time $T_{path}$, or (2) a priority vehicle object 122 operating in a priority mode approaching the intersection 166. High priority objects are described in additional detail in reference to the block 416 of process 400. An interfering object 122 in this context is a vehicle object 122 having an object path determined to enter the path of the selected vehicle 122i within the time $T_{path}$. Interfering objects 122 are described in additional detail below in reference to the block 418 of process 400. Potentially interfering objects 122, in this context, are one of (1) objects 122 for which the respective estimated object path does not cross or otherwise overlap with the path for the selected vehicle 122i, but which, due to a type of the object 122 and a current location, may potentially interfere with the $j_{th}$ path for the $i_{th}$ vehicle or (2) road obstructions in the path 170 such as traffic cones, potholes, debris, etc., that do not block the path 170, but partially block or are within a threshold distance of the path 170 and may require the vehicle operator to use caution in proceeding. Potentially interfering objects 122 are described in additional detail in reference to the block 420.

A medium likelihood of interference means in this document that there are potentially interfering objects 122 along the path 170 but there are no high priority objects 122 and no interfering objects 122 along the path 170.

A high likelihood of interference in this document means that there is at least one high priority object 122 or interfering object 122 along the path 170.

In a non-limiting example, the set of availability levels may include four levels:
  a first availability level (level 1) specifying a low likelihood of interference for the path 170 and the selected vehicle 122i can proceed at nominal speed;
  a second availability level (level 2) specifying a medium likelihood of interference for the path 170 and the vehicle can proceed at reduced speed;
  a third availability level (level 3) specifying a high likelihood of interference for the path 170 and the vehicle should stop and wait; and
  a fourth availability level (level 4) specifying that the path 170 is closed and the selected vehicle 122i should select an alternate path 170.

In addition to the specifications of the potential paths, the availability levels for each of the paths and the gated time $t_{gate}$ for each availability level, the availability message may further include a confidence level for the determined availability level for each path and a recommended speed for the selected vehicle 122i while traversing the path. The confidence level may be a number between zero and one. The confidence level can be determined based on a confidence level of proper identification of object types, and other factors related to the type, location, speed and direction of travel of object types, as described below.

The roadside infrastructure unit 110 is a stationary structure, for example a tower, including a computer 112 and one or more sensors 114. Typically, the roadside infrastructure unit 110 is located within the zone 162 and monitors traffic within the zone 162. The traffic may include the selected vehicle 122i and one or more other objects 122.

The computer 112 is generally programmed for communications on an infrastructure computer network, e.g., which may include one or more conventional communications wired or optical buses such as a CAN buses, LIN buses, Ethernet buses, Flexray buses, MOST buses, single-wire custom buses, double-wire custom buses, etc., and may further include one or more wireless technologies, e.g., WIFI, Bluetooth®, Bluetooth® Low Energy (BLE), Near Field Communications (NFC), etc. Via the infrastructure computer network, the computer 112 may transmit messages to and/or receive messages from the sensors 114 that are attached to and/or communicatively coupled to the roadside infrastructure unit 110.

Further, the computer 112 may be programmed for communicating with the vehicle objects 122 (including the selected vehicle 122i) via a network 150, which, as described below, may include various wired and/or wireless networking technologies, e.g., cellular, Bluetooth®, Bluetooth® Low Energy (BLE), Dedicated Short-Range Communications (DSRC)/80211.p, Cellular Vehicle-to-Everything (C-V2X) (4G or 5G), wired and/or wireless packet networks, etc. For example, the computer 112 may receive Signal Phase and Timing (SPAT) messages from a traffic signal 140, Basic Safety Messages from the vehicle objects 122, and/or priority messages from priority vehicle objects 122. A SPAT is a wired or wireless message from the traffic signal 140 indicating a timing of a change of the traffic signal from a current state to a next state. A BSM is a wireless message from a vehicle object 122, that includes data identifying a type of the vehicle object 122, a location of the vehicle object 122, a speed of the vehicle object 122 and a direction of travel of the vehicle object 122. A priority message is a wireless message from a priority vehicle object 122 indicating that the priority vehicle object is operating in a priority mode, and may also include one or more of a current location, speed, direction and an intended path 170 of the priority vehicle object 122.

The computer 112 can be a conventional computer with a processor and memory as described above and/or may include a dedicated electronic circuit including: one or more electronic components such as resistors, capacitors, inductors, transistors, etc.; application specific integrated circuits (ASICs); field-programmable gate arrays (FPGAs); custom integrated circuits, etc. Each of the ASICs, FPGAs, and custom integrated circuits may be configured (i.e., include a plurality of internal electrically coupled electronic components), and may further include embedded processors programmed via instructions stored in a memory, to perform operations such as receiving and processing sensor data, receiving and processing signal data from the traffic signal 140, receiving and processing vehicle data from the vehicle objects 122 in the zone 162, identifying potential paths for the selected vehicle 122i, determining availability levels for the respective paths, and determining confidence levels for the determined availability levels. The computer 112 is further programmed to transmit availability messages including the paths and respective availability levels to the selected vehicle 122i.

In some cases, the ASICs, FPGAs and custom integrated circuits may be programmed in part or in whole by an automated design system, wherein a desired operation is input as a functional description, and the automated design system generates the components and/or the interconnectivity of the components to achieve the desired function. Very High-Speed Integrated Circuit Hardware Description Language (VHDL) is an example programming language for supplying a functional description of the ASIC, FPGA or customer integrated circuit to an automated design system.

The computer 112 may further include and/or be communicatively coupled to one or more machine learning components. A machine learning component, as used herein, is an electronic component that, given a task and a performance metric, improves performance measured by the performance metric with increased experience in performing the task. Experience in this context means, as is understood in the field of machine learning, repetitions of performing the task including receiving feedback on the correctness of the result and adjusting performance based on the feedback. For example, the task may be to differentiate objects in an image that are vehicles from objects that are not vehicles. The performance metric may be the percentage of the time that the machine learning component correctly distinguishes between the vehicles and the other objects. An amount of experience may be a number of images that the machine learning component evaluates and for which it receives feedback.

In some cases, machine learning components may be trained. That is, the machine learning component is provided with training data. The training data includes multiple sets of input data and matching sets of expected output data for each of the sets of input data. The machine learning component, based on the training data, develops a mapping function that maps the input data sets to the matching output data sets. Upon developing the mapping function, the machine learning component can then receive new sets of inputs, and predict, based on the function, corresponding sets of outputs.

In other cases, machine learning components "learn" while performing their assigned task. In such cases, the machine learning components, after predicting an outcome based on a set of input data, receive actual outcome data (feedback), and use the outcome data to improve future predictions.

Non-limiting examples of known machine learning components that may be included in and/or communicatively coupled to the computer 112 are a Faster Convolutional Neural Network with Regions (R-CNN) and a "You Only Look Once" (YOLO).

In an example, the machine learning component may be given the task to identify objects in a plurality of classes. The classes may be types of objects such as automobiles, people, dogs, bicycles, etc. The machine learning component then receives images for which it identifies regions that appear to include images of objects. The machine learning component may then determine sequentially, if the image in the region matches one of the plurality of classes. The machine learning component may also indicate a confidence level in the classification.

During a learning phase, after the determination of the classification of the image, the machine learning component may receive feedback indicating whether the classification was correct. Based on the feedback, the machine learning component can adjust algorithms used to perform the classifications and determine the confidence levels.

After completing the training, the machine learning component may be used as part of an object detection system. The system can provide images to the machine learning component. The machine learning component can search the images for objects, classify the objects, and provide confidence levels regarding the classifications.

Sensors 114 can include a variety of devices for detecting the objects 122 in the zone 162. The sensors 114 can, without limitation, include short range radar, long range radar, lidar, cameras, and/or ultrasonic transducers. The sensors 114 are communicatively coupled to the computer 112 via a wired and/or wireless infrastructure network as described above. The sensors 114 may be physically coupled to the road infrastructure unit 110 or physically coupled to other stationary objects near or in the zone 162 such that a field-of-view of the respective sensor 114 includes at least a portion of the zone 162. For example, one or more sensors 114 may be physically coupled to the road infrastructure unit 110 and one more additional sensors 114 may be attached to signposts, traffic signals, or the like near or within the zone 162.

The selected vehicle 122*i* is a land vehicle such as a car, truck, motorcycle, etc., and includes a computer 130, sensors 132, actuators 134, vehicle components 136, and a human-machine interface (HMI) 138. The selected vehicle 122*i* operates on a support surface such as a road 164. During operation, the selected vehicle 122*i* may approach, enter, travel through and exit the zone 162.

The computer 130 is generally programmed for communications on a vehicle network, e.g., which may include one or more conventional vehicle communications wired or optical buses such as a CAN buses, LIN buses, Ethernet buses, Flexray buses, MOST buses, single-wire custom buses, double-wire custom buses, etc., and may further include one or more wireless technologies, e.g., WIFI, Bluetooth®, Bluetooth® Low Energy (BLE), Near Field Communications (NFC), etc. Via the vehicle network, the computer 130 may transmit messages to various devices in the selected vehicle 122*i* and/or receive messages from the various devices, e.g., controllers, sensors 132, actuators 134, components 136, the HMI 138, etc. Alternatively or additionally, in cases where the computer 130 comprises multiple devices, the vehicle network may be used for communications between devices represented as the computer 130 in this disclosure. The computer 130 can be a generic computer with a processor and memory and/or may include a dedicated electronic circuit including: one or more electronic components such as resistors, capacitors, inductors, transistors, etc.; application specific integrated circuits (ASICs); field-programmable gate arrays (FPGAs); custom integrated circuits, etc., as described above in reference to the computer 112.

In addition, the computer 130 may be programmed for communicating with the network 150, which, as described below, may include various wired and/or wireless networking technologies, e.g., cellular, Bluetooth®, Bluetooth® Low Energy (BLE), Dedicated Short-Range Communications (DSRC), Cellular Vehicle-to-Everything (C-V2X), wired and/or wireless packet networks, etc.

Sensors 132 can include a variety of devices. For example, various controllers in a selected vehicle 122*i* may operate as sensors 132 to provide vehicle data via the subject vehicle network, e.g., data relating to vehicle speed, acceleration, location, subsystem and/or component status, etc. The sensors 132 can, without limitation, also include short range radar, long range radar, lidar, cameras, and/or ultrasonic transducers. The sensors 132 can also include a navigation system that uses the Global Positioning System (GPS), and that provides a location of the selected vehicle 122*i*. The location of the selected vehicle 122*i* is typically provided in a conventional form, e.g., geo-coordinates such as latitude and longitude coordinates.

Actuators 134 are electronic and/or electromechanical devices implemented as integrated circuits, chips, or other electronic and/or mechanical devices that can actuate various vehicle subsystems in accordance with appropriate control signals as is known. The actuators 134 may be used to control vehicle components 136, including braking, acceleration, and steering of the vehicle 122i. The actuators 134 can further be used, for example, to actuate, direct, or position the sensors 132.

The selected vehicle 122i can include a plurality of vehicle components 136. In this context, each vehicle component 136 includes one or more hardware components adapted to perform a mechanical function or operation-such as moving the selected vehicle 122i, slowing or stopping the selected vehicle 122i, steering the selected vehicle 122i, etc. Non-limiting examples of components 136 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 136 can include computing devices, e.g., electronic control units (ECUs) or the like and/or computing devices such as described above with respect to the computer 130, and that likewise communicate via a subject vehicle network.

The selected vehicle 122i further includes a human-machine interface 138. The human-machine interface 138 includes a plurality of input components such as knobs, buttons, levers, pedals (e.g., a brake pedal and an accelerator pedal), touchscreen displays, etc., with which an operator can provide input to the computer 130. The human-machine interface 138 further contains a plurality of output components which may include one or more displays (including touchscreen displays), heads-up displays, lamps, speakers; and haptic devices. In an example, the computer 112 may display potential paths for a selected vehicle 122i on a display together with availability levels for the respective paths.

The selected vehicle 122i can operate in one of a fully autonomous mode, a semiautonomous mode, or a non-autonomous mode. A fully autonomous mode is defined as one in which each of the subject vehicle propulsion (typically via a powertrain including an electric motor and/or internal combustion engine), braking, and steering are controlled by the computer 130. A semi-autonomous mode is one in which at least one of the subject vehicle propulsion (typically via a powertrain including an electric motor and/or internal combustion engine), braking, and steering are controlled at least partly by the computer 130 as opposed to a human operator. In a non-autonomous mode, i.e., a manual mode, the selected vehicle 122i propulsion, braking, and steering are controlled by the human operator. During operation of the selected vehicle 122i in an autonomous or semi-autonomous mode, the computer 130 may operate the selected vehicle 122i based on the vehicle data, including the radar, digital camera and lidar data. The computer 130 may receive mission instructions, which may include a map of the environment in which the selected vehicle 122i is operating, and one or more mission parameters. The mission parameters are parameters defining the mission and may include an origin, a destination, a departure time, and an expected time of arrival. Based on the mission instructions, the computer 130 may determine a planned route for the selected vehicle 122i. A planned route means a specification of the streets, lanes, roads, etc., along which the host vehicle plans to travel, including the order of traveling over the streets, lanes, roads, etc., and a direction of travel on each, for a trip, i.e., from the origin to the destination. During operation, the computer 130 operates the vehicle along a path. A used herein, a path is a line and/or curve (defined by points specified by coordinates such as geo-coordinates) steered by the host vehicle along the planned route.

For example, a path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed and acceleration including positions in x, y, z, yaw, pitch, roll, yaw rate, pitch rate, roll rate, heading velocity and heading acceleration that can be determined by fitting a polynomial function to successive 2D locations included in vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the vehicle 122i at the upcoming distance x, $a_1$ is a heading angle of the path, $a_2$ is the curvature of the path, and $a_3$ is the curvature rate of the path.

During operation through a zone 162, the computer 130 may additionally receive availability messages from the roadside infrastructure unit 110 including availability levels for potential paths for the selected vehicle 122i through the zone 162. Based on the messages, the computer 130 may adjust/control one or more of the paths, a speed of travel, and/or a time of travel of the selected vehicle 122i through the zone 162. The computer 130 may further display the potential paths, together with indications of the respective priorities via the HMI 138 to human operators and/or occupants of the selected vehicle 122i.

The system 100 may detect one or more objects 122 in the zone 162. The objects 122, are physical, i.e., material, structures or bodies. Examples of objects 122 include vehicle objects 122, pedestrian objects 122, bicycles 122, motorcycles 122, etc. The objects 122 may be currently in motion, i.e., entering, travelling through, or exiting the zone 162. Alternatively, the objects 122 may be currently stationary, i.e., parked, waiting to cross the road 164, etc. In the case of objects 122 that are vehicle objects 122, the vehicle objects 122 may be similar to the selected vehicle 122i and will not be further described herein.

The system 100 may further include a traffic signal 140. The traffic signal 140 includes a computer 142, one or more output displays such as lamps and speakers, and may further include one or more input device such as buttons. The computer 142 is programmed to output signals via the lamps and speakers to control a flow of traffic through an intersection 166. For example, the traffic signal may output green, yellow and red lights, green arrows, red arrows, lighted walk/do not walk signs etc., that may be blinking or non-blinking, to indicate levels of priority that the vehicle objects 122 and pedestrian objects 122 have to travel through the intersection 166. Still further, the signals may include audible signals such as beeping sounds indicating when pedestrians have priority to cross the road 164. The computer 142 is programmed to change a state of the output signals from time-to-time to control a flow of traffic through the intersection 166.

The computer 142 may further be programmed to receive input from one or more buttons. For example, the traffic signal may include buttons located at crosswalks that, for example, can be activated by pedestrians that wish to cross the road 164 at a crosswalk. In this case, the computer 142 may be programmed to alter a sequence of signals to include a period of priority for a pedestrian to cross the road 164 at the crosswalk.

The computer 142 may further be programmed to communicate, for example via the network 150, with the roadside infrastructure unit 110. In an example, the computer 142 may send Signal Phase and Timing (SPAT) messages to the roadside infrastructure unit 110 indicating when the traffic signal will change states. Changing states in this context means changing priorities for vehicles and or pedestrians travelling through the intersection 166, such as, for example, changing a first light signal for a first direction of travel from green to red (reducing the priority for travel in the first direction), and changing the a light signal for a second direction of travel from red to green (increasing the priority for travel in the second direction).

The system 100 further includes a network 150 and a server 152. The network 150 may provide communications between any of the selected vehicle 122i, the one or more vehicle objects 122, the traffic signal 140 and the server 152 to each other.

The network 150 represents one or more mechanisms by which the subject vehicle computer 130, object vehicle computers, the traffic signal computer 142 and the server 152 can communicate with each other. Accordingly, the network 150 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), Cellular Vehicle-to-Everything (C-V2X), local area networks (LAN) and/or wide area networks (WAN), including the Internet, providing data communication services.

The server 152 can be a conventional computing device, i.e., including one or more processors and one or more memories, programmed to provide operations such as disclosed herein. Further, the server 152 can be accessed via the network 150, e.g., the Internet or some other wide area network. The server 152 can provide data, such as map data, traffic data, weather data, etc. to the subject vehicle computer 130, the object vehicle computers, the traffic signal computer 142, etc.

As discussed above, the roadside infrastructure unit 110 can have a plurality of sensors 114, including radar, cameras, lidar, ultrasonic sensors, infrared sensors, etc. that provide data about objects 122 in the zone 162.

Radar is a detection system that uses radio waves to determine the relative location, angle, and/or velocity of an object. The roadside infrastructure unit 110 may include one or more radar sensors 114 to detect objects in the zone 162.

The roadside infrastructure unit 110 may further include one or more digital cameras 114. A digital camera 114 is an optical device that record images based on received light. The digital camera 114 includes a photosensitive surface (digital sensor), including an array of light receiving nodes, that receives the light and converts the light into images. Digital cameras 114 generate frames, wherein each frame is an image received by the digital camera 114 at an instant in time. Each frame of data can be digitally stored, together with metadata including a timestamp of when the image was received.

The roadside infrastructure unit 110 may further include one or more lidar sensors 114. Lidar is a method for measuring distances by illuminating a target with laser light and measuring the reflection with a lidar sensor 114. Differences in laser return times and wavelengths can be used to generate digital 3-D representations of a target, referred to as point clouds. A point cloud is a collection of data points in space defined by a coordinate system and representing external surfaces of the detected target.

A lidar sensor 114 typically collects data in scans. For example, the lidar sensor 114 may execute 3600 scans through the zone 162. During the scan, the lidar may complete tens of thousands of individual point measurements. The computer 112 may receive the scans and store the scans together with metadata including a timestamp, where the timestamp marks a point, for example the beginning, of each scan. Additionally or alternatively, each point from the scan can be stored with metadata, which may include an individual timestamp.

The zone 162 is a volume defined by an area defined by the periphery 160 and space above the area in which the system 100 monitors the type, location, speed and direction of travel of the selected vehicle 122i and other objects 122. The sensors 114 communicatively coupled with the roadside infrastructure unit 110 computer 112 can be arranged such that their respective fields-of-view extend into and cover all or a portion of the zone 162. The zone 162 may be designated based on historical data indicating that an amount of potential interference between the objects 122 travelling within the zone 162 is greater than a threshold amount. As an example, intersections 166 in a municipality may be ranked based on historical data indicating the amount of object interference within the respective intersections, and the intersections 166 selected that have the highest amount of object interference, based on available resources.

As described further below, the computer 112 can identify for the selected vehicle 122i, one or more paths 170 for the selected vehicle 122i to travel through the intersection 166. Each path includes an entry point 172 and exit point 174. The entry point 172 may be a current location of the selected vehicle 122i when it is detected to have entered the zone 162 and to be travelling toward or in the intersection 166. Each path further includes an exit point 174. An exit point 174 in this context is a location through which the selected vehicle 122i will pass along a respective path as or after it exits the intersection 166. The computer 112 in the roadside infrastructure unit 110 can define one potential path 170 for each potential exit route for the selected vehicle 122i.

As a non-limiting example, still referencing FIG. 1, the system 100 can define four potential paths 170a, 170b, 170c, 170d (collectively potential paths 170) for the selected vehicle 122i through the intersection 166. Each of the four potential paths 170a, 170b, 170c, 170d have a same entry point 172. The entry point 172 is based on a current location of the selected vehicle 122i and may be, for example, a point directly in front of the selected vehicle 122i or a point along a longitudinal axis of the selected vehicle 122i. The paths 170a, 170b, 170c, 170d, further have the respective exit points 174a, 174b, 174c, 174d, one for each potential exit lane by which the selected vehicle 122i can exit the intersection 166. In the example of FIG. 1, there are four options for the selected vehicle 122i to exit the intersection 166 as shown in Table 1.

TABLE 1

| Path | Direction | Exit Point |
|---|---|---|
| 170a | right turn | 174a |
| 170b | straight | 174b |
| 170c | left turn | 174c |
| 170d | U-turn | 174d |

Figure 2:
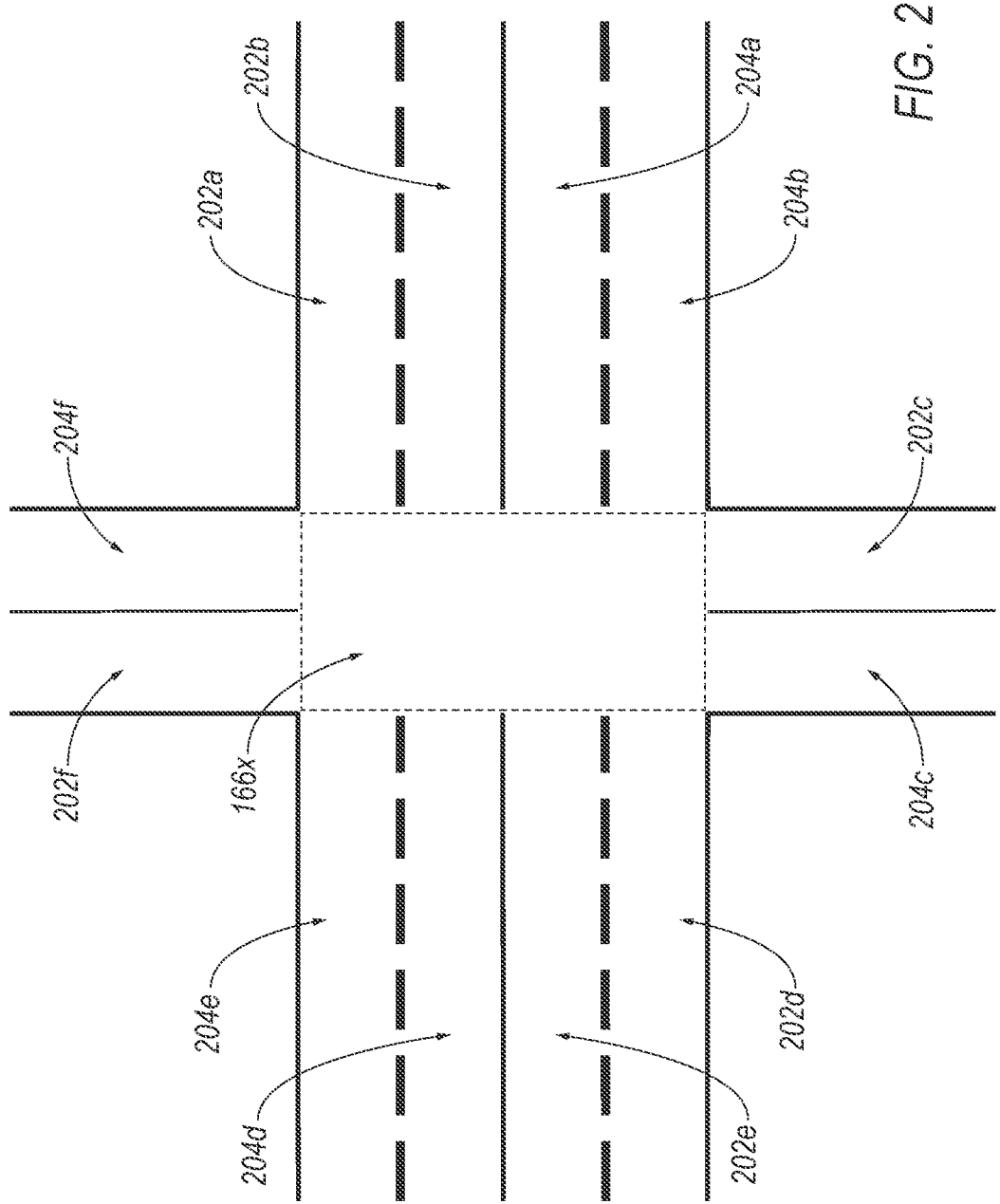
FIG. 2 is a diagram of an example intersection illustrating entry lanes and exit lanes.

Potential exit lanes 204 for a selected vehicle 122i depend on a configuration of an intersection 166, an entry lane 202 by which the selected vehicle 122i enters the intersection 166, and typically further depend on traffic regulations governing the intersection 166. FIG. 2 illustrates entry lanes 202 and exit lanes 204 for an example intersection 166x. An entry lane 202 in this context is any lane that enters the intersection 166x. An exit lane 204 in this context is any lane exiting the intersection 166x. The intersection 200 includes six entry lanes 202a, 202b, 202c, 202d, 202e and 202f and six exit lanes 204a, 204b, 204c, 204d, 204e and 204f. A selected vehicle 122i entering the intersection 166x via an entry lane 202 may potentially exit via one or more exit lanes 204 depending on the entry lane 202 and traffic regulations. For example, the Table 2 below identifies an example set of potential exit lanes 204 for each entry lane 202. Table 2 assumes that u-turns are prohibited, right turns can only be made from a right lane of roads with two or more lanes in a same direction, and left turns can only be made from a left lane of roads having two or more lanes in the same direction.

TABLE 2

| Entry Lane | Potential Exit Lanes |
|---|---|
| 202a | 204f, 204e, 204d |
| 202b | 204e, 204d, 204c |
| 202c | 204b, 204a, 204f, 204e, 204d |
| 202d | 204c, 204b, 204a |
| 202e | 204f, 204a, 204b |
| 202f | 204e, 204d, 204c, 204b, 204a |

Table 2 is a non-limiting example that maps entry lanes 202 to potential exit lanes 204 for the example intersection 166x. In practice, a zone 162 surrounding an intersection 166 may have a dedicated roadside infrastructure unit 110 including a dedicated computer 112. The dedicated computer 112 may include a table, such as Table 2, that is specific for the intersection 166. The table may account for traffic regulations, physical barriers (islands, speed bumps, etc.) and other features of the intersection 166 that determine potential exit lanes 204 for respective entry lanes 202.

Figure 3:
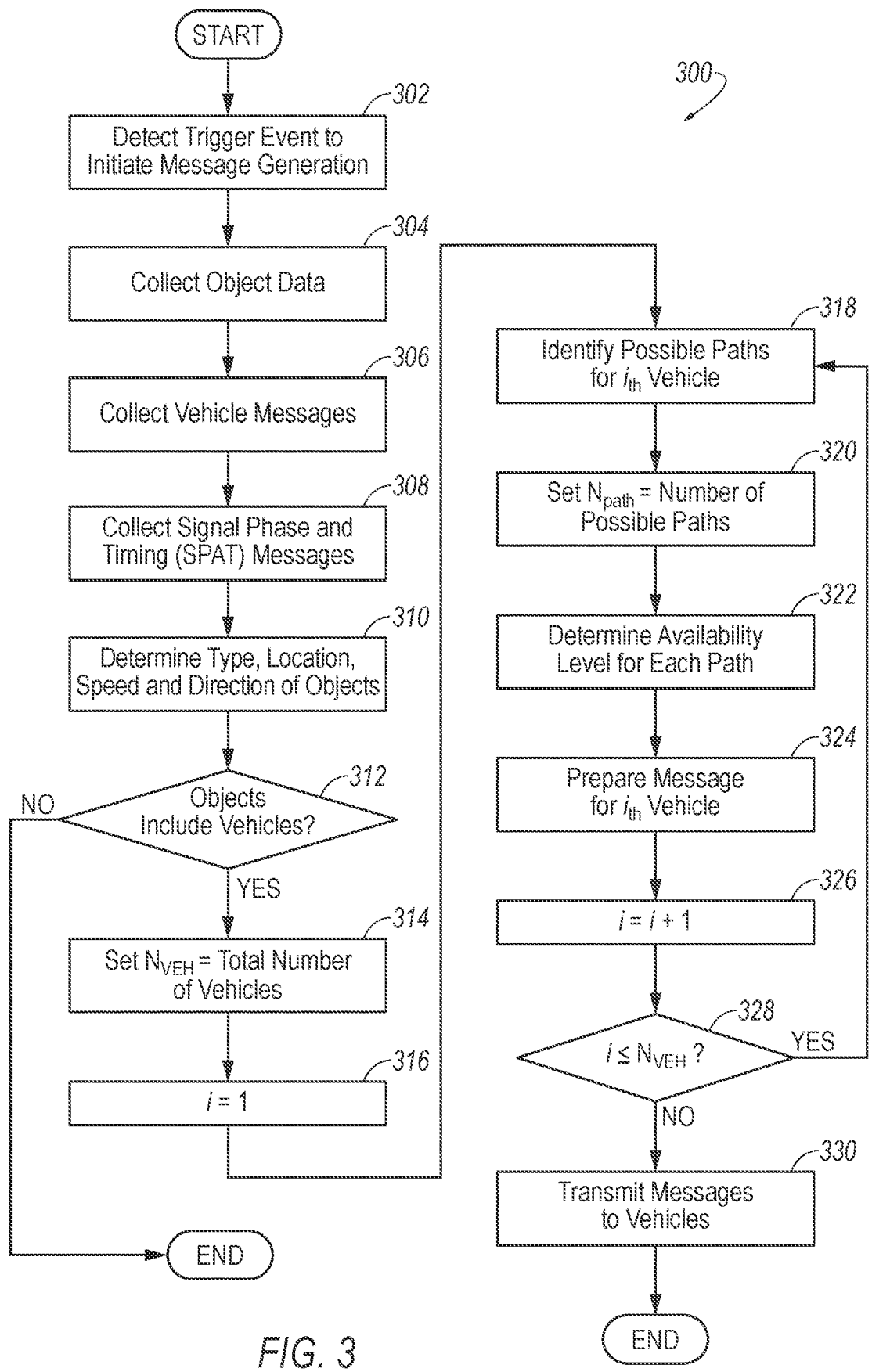
FIG. 3 is a diagram of an example process for assigning priorities to one or more paths through an intersection respectively for one or more vehicles.

FIG. 3 is a diagram of an example process 300 for assigning availability levels to one or more vehicle objects 122 in a zone 162 surrounding an intersection 166. As described above, a computer 112 on a roadside infrastructure unit 110 is programmed to consider each vehicle object 122 within the zone 162 sequentially as the selected vehicle 122i. The process 300 begins in a block 302.

In the block 302, the computer 112 detects an availability message generation trigger event, i.e., a receipt of data that is specified to initiate generation of an availability message. As non-limiting examples, the availability message generation trigger event trigger event may be: object data from sensors 114 indicating that an object 122 has entered the zone 162; an elapsed period of time since a most recent previous availability message generation (i.e., the update time $t_{update}$, described above); receipt of a Signal Phase and Timing (SPAT) message from a traffic signal 140; receipt of a Basic Safety Message (BSM) from a vehicle object 122 in the zone 162; receipt of a priority message from a priority vehicle object 122; or an operator input to the computer 112 requesting initiation of an availability message generation event. Upon detecting the availability message generation trigger event by the computer 112, the process 300 continues in a block 304.

In the block 304, the computer 112 collects object data from sensors 114. The process continues in a block 306.

In the block 306, the computer 112 collects vehicle messages from vehicle objects 122 in the zone 162, when such messages are available. Vehicle messages in this context includes Basic Safety Messages (BSMs) and priority messages from priority vehicle objects 122. These messages may or may not be available. Some vehicle objects 122 may be programmed to transmit BSMs and other vehicle objects 122 may not. Priority vehicle objects 122 may transmit priority messages, for example, only when the priority vehicle object 122 is operating in a priority mode. The block 306 may operate in the background, i.e., it may run continuously such that BSMs and priority messages are collected whenever they are received during the process 300. The process 300 continues in a block 308.

In the block 308, the computer 112 collects Signal Phase and Timing (SPAT) messages from a traffic signal 140, when such messages are available. That is, some zones 162 may not include a traffic signal 140 or may include a traffic signal that does not transmit SPAT messages. In cases where a traffic signal 140 transmits SPAT signals, the timing of the SPAT signals may be determined by a computer 142 in the traffic signal 140. The block 308 may operate in the background, i.e., it may run continuously such that BSMs are collected whenever they are received during the process 300. The process 300 continues in a block 310.

In the block 310, the computer 112 applies object recognition techniques as are known to determine a type of objects 122 detected in the zone 162. For example, based on object data collected by the sensors 114, the computer 112 may apply a machine learning component such as a trained Convolutional Neural Networks with Regions (R-CNN) or a YOLO (You Only Look Once) to identify objects 122 detected in the zone 162. The machine learning component may identify object types for the objects 122 and additionally determine a confidence level for each of the identifications.

As noted above, a type of object is a classification or category of objects having common features. Non-limiting types of objects 122 for which the computer 112 (e.g., via a machine learning program) can be programmed to detect includes vehicles such as sedans, sport utility vehicles, pick-up trucks, trailer trucks, semi-trucks, tow trucks, motorcycles, etc.; priority vehicles such as fire engines, police vehicles, ambulances, etc.; personal transportation devices such as bicycles, tricycles, scooters, skateboards, electric bicycles, motorized scooters, mopeds, etc.; pedestrians that are standing, walking, jogging, skating, etc.; animals such dogs, cats, etc.; and road obstructions such as barriers, traffic cones, potholes, debris, etc. For each type of object 122, the computer 112, or the machine learning program associated with the computer 112 can be trained to identify the object types based on common characteristics.

For example, police vehicles can be identified by a presence of common features such as colored light arrays, spotlights, radio frequency transmitting antennas, marking on the vehicles such as "Police," The computer 112 can further be programmed to detect, for example, that a priority vehicle object 122 is operating in a priority mode based on detecting flashing lights and/or sirens.

Additionally or alternatively to using data from sensors 114 for determining the object type, the computer 112 can use data received in Basic Safety Messages from vehicle objects 122, which include data indicating a type of the vehicle 122. Still further, the computer 112 may receive messages (wireless transmissions) from priority vehicle objects 122 indicating that the priority vehicle object 122 is currently operating in a priority mode.

In the block 310, the computer 112 may further use known techniques to determine a location, speed and direction respectively for the objects 122 detected in the zone 162. As described above, the roadside infrastructure unit 110 includes a plurality of sensors 114 which may include radar sensors 114, cameras 114 and lidar sensors 114. Radar sensors 114 based on a timing and phase of returned radar signals can determine a location and speed of an object 122. Lidar sensors 114 can build three-dimensional models of the zone 162 including objects 122 in the zone 162. The three-dimensional models can indicate locations of objects 122 in the zone 162. By using multiple cameras 114, stereo images of the space in and above the zone can be developed that indicate a location of object 122. The radar data, lidar data and camera data 122 can further be fused, as done in techniques for operating autonomous vehicles.

Further, the roadside infrastructure unit 110 and associated sensors 114, can determine a speed and direction of objects 122 based on multiple images/scans collected over an amount of time. For example, based on two sequential images/scans taken at times $t_0$ and $t_1$, the computer 112 can determine a direction of the object 122 by extrapolating a straight line through the location $l_0$ and the location $l_1$. The computer 112 can determine the speed of the object 122 to be the distance between the location $l_0$ and the location $l_0$ divided by the difference in time $t_1-t_0$.

Additionally or alternatively, for vehicle objects 122 that transmit BSMs and priority object vehicles 122 that transmit priority messages, the computer 112 may determine the object type, location, speed and direction from a BSM transmitted by the vehicle object 122. The computer 112 can further determine the object type, location, speed and direction of priority vehicle objects 122 based on the priority messages from the priority vehicle objects 122 indicating that they are operating in a priority mode and providing type, location, speed and direction data. Still further, the computer 112, determines a number $N_{obj}$ of the objects 122 detected in the zone 162 and assign a number from 1 to $N_{obj}$ for the objects 122. The process 300 continues in a block 312.

In the block 312, based on the determined object types, the computer 112 determines whether one or more of the objects 122 is a vehicle object 122 and if so, how many of the objects 122 are vehicle objects 122. In the case that the computer 112 determines that the objects 122 include one or more vehicle objects 122, the process 300 continues in a block 314. Otherwise, the process 300 ends.

In the block 314, the computer sets a parameter $N_{veh}$ equal to the number of vehicle objects 122 in the zone 162. The process continues in a block 316.

In the block 316, the computer 112 sets an index i=1, where i is an index applied by the computer 112 respectively to each vehicle object 122 as it sequences through the vehicle objects 122 in the zone 162. The computer 112 is programmed to consider the $i_{th}$ vehicle as the selected vehicle 122i, and identify potential paths (block 318 below, and referencing FIG. 2), determine availability of the potential paths and generate an availability message for the $i_{th}$ vehicle. The process 300 continues in a block 318.

In the block 318, the computer 112 identifies potential exit lanes 204 for the $i_{th}$ vehicle. Potential exit lanes 204 for the $i_{th}$ vehicle are lanes by which the $i_{th}$ vehicle can exit an intersection 166 that the $i_{th}$ vehicle is approaching or entering via a known entry lane 202, as described above. The process 300 continues in a block 320.

In the block 320, the computer 112 sets a parameter $N_{path}$ equal to the number of potential paths 170 for the $i_{th}$ vehicle to exit the intersection 166. Generally, there will be one potential path 170 for each potential exit lane 204 for the $i_{th}$ vehicle. The process continues in a block 322.

In the block 322, the computer 112 determines an availability level for each potential path for the $i_{th}$ vehicle. The computer 112 may further assign a confidence level to the availability levels. The process 400, described below, is an example process for determining the availability level for each of the potential paths for the $i_{th}$ vehicle and for determining the associated confidence levels. The computer 112 may, for example, call the process 400, described below, as a subroutine for the process 300. Upon determining the availability levels for the potential paths, the process 300 continues in a block 324.

In the block 324, the computer 112 prepares an availability message for the $i_{th}$ vehicle. The availability message identifies each of the potential paths 170 for the $i_{th}$ vehicle, and the determined availability level for each of the potential paths. The availability message and may further include the confidence level assigned to each availability level and the gated time $t_{gate}$ for the availability level. The availability message may further include a recommended speed for the $i_{th}$ vehicle to traverse each of the potential paths 170. The computer 112 stores the prepared availability message for later transmission. The process 300 continues in a block 326.

In the block 326, the computer 112 increments the index i. That is, the computer 112 calculates i according to equation 2.

$$i=i+1 \qquad (2)$$

The process 300 continues in a block 328.

In the block 328, the computer 112 determines whether i is less than or equal to the number of vehicles $N_{veh}$. If i is less than or equal to the number of $N_{veh}$, the process 300 continues in the block 318, and repeats, for the $i_{th}$ vehicle, the process of identifying the potential paths 170, determining an availability level for each of the paths 170, and preparing an availability message. If i is greater than $N_{veh}$, the process continues in a block 330.

In the block 330, the computer 112 transmits availability messages to each of the vehicle objects 122 in the zone 162. The process 300 ends.

Figure 4A:
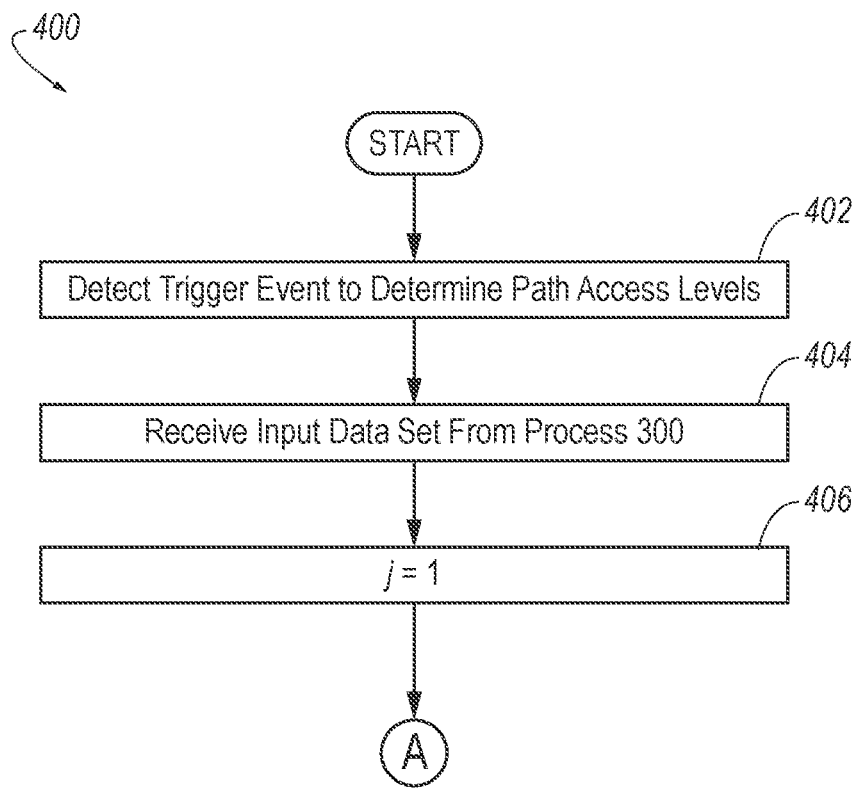
FIGS. 4A and 4B are a diagram of an example process for assigning availability levels to paths for a respective vehicle.
Figure 4B:
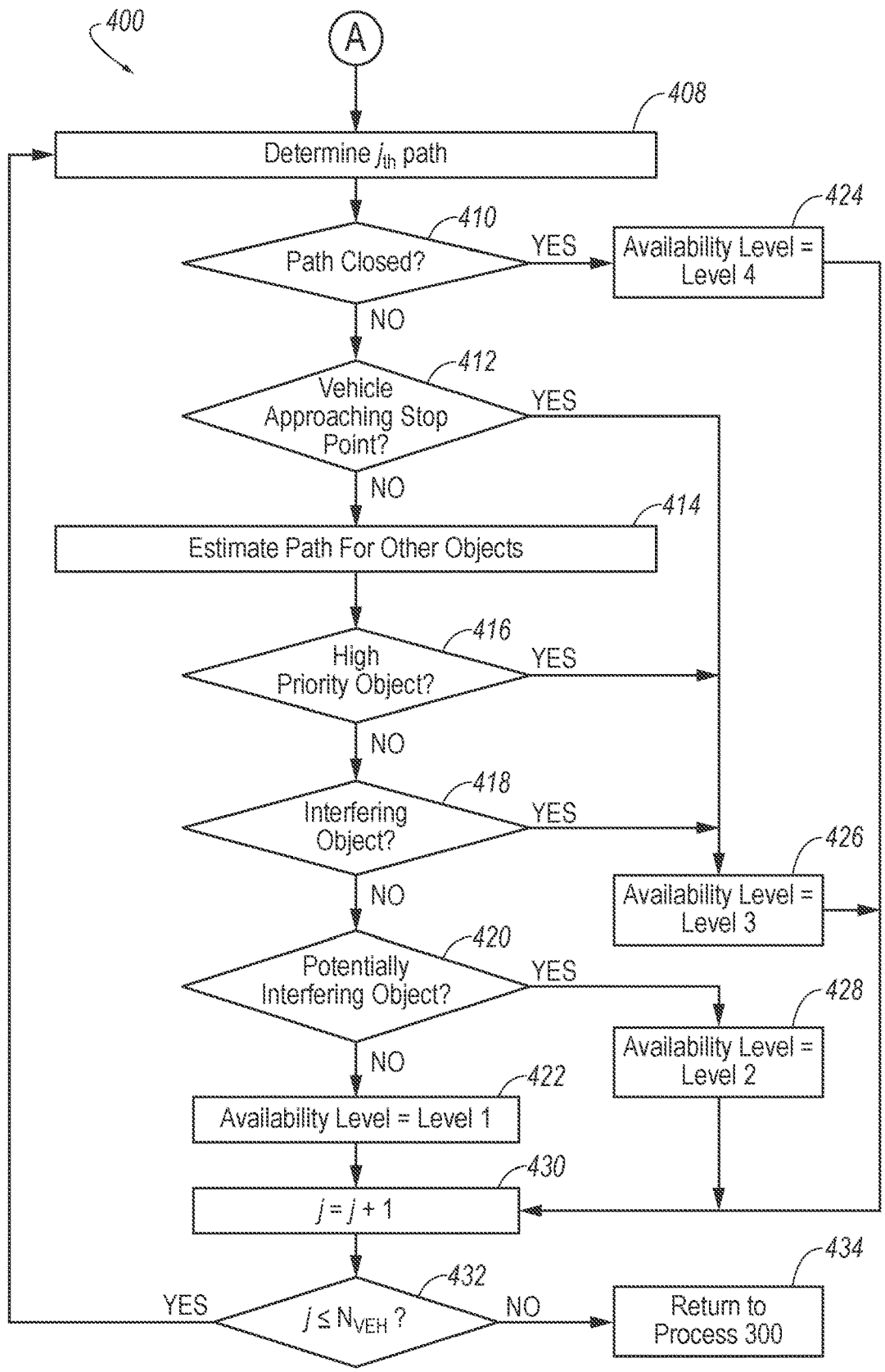

FIGS. 4A and 4B are collectively a diagram of an example process 400 to determine an availability level for each potential path for the $i_{th}$ vehicle 122i. This process can operate as a subroutine to the process 300, and can be called, for example, by the block 322. The process 400 begins in a block 402.

In the block 402, the computer 112 detects a trigger event to determine an availability level for a path 170 for the $i_{th}$ vehicle, i.e., a receipt of data that is specified to initiate determination of the availability level for the path 170. As non-limiting examples, the trigger event may be a functional call, a digital flag that is set, an interrupt, or other digital signal generated by the process 300, for example in the block 322. Upon detecting the trigger event, the process 400 continues in a block 404.

In the block 404, the computer 112 transfers, or provides availability to the data collected in the process 300, including object data, data from SPAT messages, data collected from Basic Safety Messages, data collected from priority messages, and all data derived therefrom including the respective type, location, speed and direction of the objects 122 in the zone (e.g., the objects 122 in the zone 162.) The computer 112 further transfers or provides availability to the number of paths $N_{path}$, for the $i_{th}$ vehicle. The process 400 continues in a block 406.

In the block 406, the computer 112 sets an index j=1, where j is an index applied by the computer 112 respectively to each possible path 170 for the $i_{th}$ vehicle through the intersection 166 as it sequences through the possible paths 170. The process 400 continues in a block 408.

In the block 408, the computer 112 determines the $j_{th}$ path for the $i_{th}$ vehicle. The computer 112 receives, for example from the block 318 of process 300, a list of possible paths 170 for the $i_{th}$ vehicles, wherein the possible paths 170 are numbered from 1 to $N_{path}$. The list of possible paths 170 may, for example, identify the entry lane 202 and the exit lane 204 for each possible path 170.

As noted above, the computer 112 may determine an entry point 172 for the $j_{th}$ path based on the current location of the $i_{th}$ vehicle. The computer 112 may further, based on the exit lane 204 for the $j_{th}$ path, identify an exit point 174 for the $j_{th}$ path. As an example, the computer 112 may include a table, indicating for each exit lane 204, an exit point 174. The exit point 174 may be selected in advance for the intersection 166, for example, to be in a middle of the exit lane 204, at a position along the exit lane 204 beyond an historical area of high traffic. The computer 112 can then calculate a path 170 from the entry point 172 to the exit point 174 using path planning techniques as are known. The computer 112 can further calculate an estimated time $t_{path}$ to reach the exit point 204 based on the vehicle speed and the known exit point 204.

In another example, the computer 112 may include a table of potential paths 170 through the intersection 166 from each entry point 172 and each possible exit lane 204. The computer 112 can select a path 170 for the $i_{th}$ vehicle from the table based on the exit lane 204 for the $j_{th}$ path. The computer 112 can further calculate a distance the $i_{th}$ vehicle will travel along the path in a fixed amount of time $t_{path}$ based on the speed of the $i_{th}$ vehicle. The fixed amount of time $t_{path}$ in this case may be a time, for example, seven seconds, between consecutive calculations of the availability levels for vehicle objects 122. The computer 112 may determine the location of the exit point 174, to be the expected location of the $i_{th}$ vehicle along the $j_{th}$ path at the end of the fixed amount of time $t_{path}$. Upon determining the $j_{th}$ path including the entry point 172 and exit point 174, the process 400 continues in a block 410.

In the block 410, the computer 112 determines, based on available data, if the $j_{th}$ path is blocked or closed. For example, the computer 112 may have data, for example data received from the server 152, that the $j_{th}$ path is closed. As another example, based on object recognition, the computer 112 may recognize an object 122 such as a barrier blocking the exit lane 204 for the ja path. As another example, based on data from the sensors 114, or traffic data, for example from the server 152, the computer 112 may determine that the exit lane 204 is blocked due to an accident. In the case that the computer 112 determines that the $j_{th}$ path is closed or blocked, the process 400 continues in a block 424. Otherwise, the process 400 continues in a block 412.

In the block 412, the computer 112 determines whether the $i_{th}$ vehicle, along the $j_{th}$ path will need to stop due to a traffic signal 140 or stop sign prior to entering the intersection 166. In the case that the $i_{th}$ vehicle will need to stop due to the traffic signal 140 or stop sign, the process 400 continues in a block 426. Otherwise, the process 400 continues in a block 414.

In the block 414, the computer 112 determines an estimated object path for respective objects 122 in the zone 162, based on data collected by the computer 112. The process 500, described below, is an example process for estimating the object path for respective objects 122. The computer 112 may, for example, call the process 500, described below, as a subroutine for the process 400. Upon determining the estimated object paths for the respective objects 122, the process 400 continues in a block 416.

In the block 416, the computer 112 determines if one or more of the identified objects 122 is a high priority object 122, based on the type, location, speed, and direction of objects 122 as determined in process 300, block 310. A high priority object 122, in this context means an object 122 which the $i_{th}$ vehicle should give priority. High priority objects 122 can include priority vehicle objects 122 accorded high priority due to their function, such as ambulances, police vehicles, fire engines, transit vehicles, etc. when they are operating under priority conditions, i.e., communicating via visual signals (e.g. flashing lights), audio signals (e.g. sirens) and/or electronic messages that they currently have priority over other vehicle objects 122. High priority objects 122 can further include pedestrian objects 122 on foot, skating, using personal transportation devices 122, etc. that are crossing cross walks or that otherwise have an estimated object path indicating that they will interfere with the $i_{th}$ vehicle. In the case that the computer 112 determines that the objects 122 includes one or more high priority objects 122, the process 400 continues in a block 426. Otherwise, the process 400 continues in a block 418.

In the block 418, the computer 112 determines whether the objects 122 include one or more interfering objects 122. Interfering objects 122, in this context, are objects 122 for which the respective estimated object path crosses or otherwise overlaps with the $j_{th}$ path for the $i_{th}$ vehicle during the time $t_{path}$. In the case that the objects 122 include interfering objects 122, the process 400 continues in a block 426. Otherwise, the process 400 continues in a block 420.

In the block 420, the computer 112 determines whether the objects 122 include one or more potentially interfering objects 122. Potentially interfering objects 122, in this context, are objects 122 for which the respective estimated object path does not cross or otherwise overlap with the $j_{th}$ path for the $i_{th}$ vehicle, but which, due to a type of the object 122 and a current location, may potentially interfere with the $j_{th}$ path for the $i_{th}$ vehicle.

For example, potentially interfering objects 122 can include pedestrians and animals within a threshold distance of the $j_{th}$ path for the $i_{th}$ vehicle. The threshold distance may be a fixed distance such as 3 meters that the object 122 could travel within the time $t_{path}$. Alternatively, the threshold distance may be determined based a distance the type of the respective object can reasonably travel within the time $t_{path}$. Potentially interfering objects 122 can further include road obstructions 122 in the $j_{th}$ path such as traffic cones, potholes, debris, etc., that do not block the $j_{th}$ path, but block or are within a threshold distance of the $j_{th}$ path and may require the $i_{th}$ vehicle operator to use caution in proceeding. In the case that the objects 122 include potentially interfering objects 122, the process 400 continues in a block 428. Otherwise, the process 400 continues in a block 422.

In the block 422, the computer 112 determines an availability level 1 for the $j_{th}$ path for the $i_{th}$ vehicle. Further, based on not having identified any high priority, interfering, or potentially interfering objects 122, the computer 112 can set a confidence level for the availability level equal to one. Based on the $j_{th}$ path and the availability level 1, the computer 112 may further determine a recommended speed for the $i_{th}$ vehicle. As noted above, the recommended speed for availability level 1 is a nominal speed. As an example, the computer 112 may maintain a table for each of the potential paths through the intersection 166. The table may include a recommended nominal speed and a recommended reduced speed for each path. In the case of availability level 1, the computer 112 can select the nominal speed as the recommended speed for the $j_{th}$ path. The process 400 continues in a block 430.

In the block 424, which follows the block 410, the computer determines an availability level 4 for the $j_{th}$ path for the $i_{th}$ vehicle. For availability level 4, the confidence level can be set to one. The process 400 continues in a block 430.

In the block 426, which can follow the blocks 412, 416 and 418, the computer 112 determines an availability level 3 for the $j_{th}$ path for the $i_{th}$ vehicle. The confidence level for the availability level 3 determination can be set to one based on the identification of either a stop point (due to a traffic signal), a high priority object 122 approaching the intersection 166 or an interfering object 122. The process 400 continues in the block 430.

In the block 428, which can follow the block 420, the computer 112 determines an availability level 2 for the $j_{th}$ path for the $i_{th}$ vehicle. The confidence level may be a value between zero and one set based on a confidence level of the object identification for the potentially interfering object, as generated by the machine learning component during object identification in the process 300 (block 310).

Based on the $j_{th}$ path and the availability level 2, the computer 112 may further determine a recommended speed for the $i_{th}$ vehicle. As noted above, the recommended speed for availability level 2 is a reduced speed. As described in reference to block 422, the computer 112 may maintain a table of recommended nominal and reduced speeds for potential paths through the intersection 166. The computer 112 can select the recommended reduced speed as the recommended speed for the $j_{th}$ path. The process 400 continues in the block 430.

In the block 430, the computer 112 increments the index j. That is, the computer 112 calculates j according to equation 3.

$$j=j+1 \quad (3)$$

The process 400 continues in a block 432.

In the block 432, the computer 112 determines whether j is less than or equal to the number of vehicles $N_{veh}$. If j is less than or equal to $N_{veh}$, the process 400 continues in the block 408, and repeats the process of determining an availability level for the $j_{th}$ path for the $i_{th}$ vehicle. If j is greater than $N_{veh}$, the process continues in a block 434.

In the block 434, the computer 112 transfers or makes available data generated in the process 400, such as path specifications, availability levels for the paths, and confidence levels for the determined availability levels, to the process 300. The process 400 ends and process 300 resumes operation at block 324.

Figure 5A:
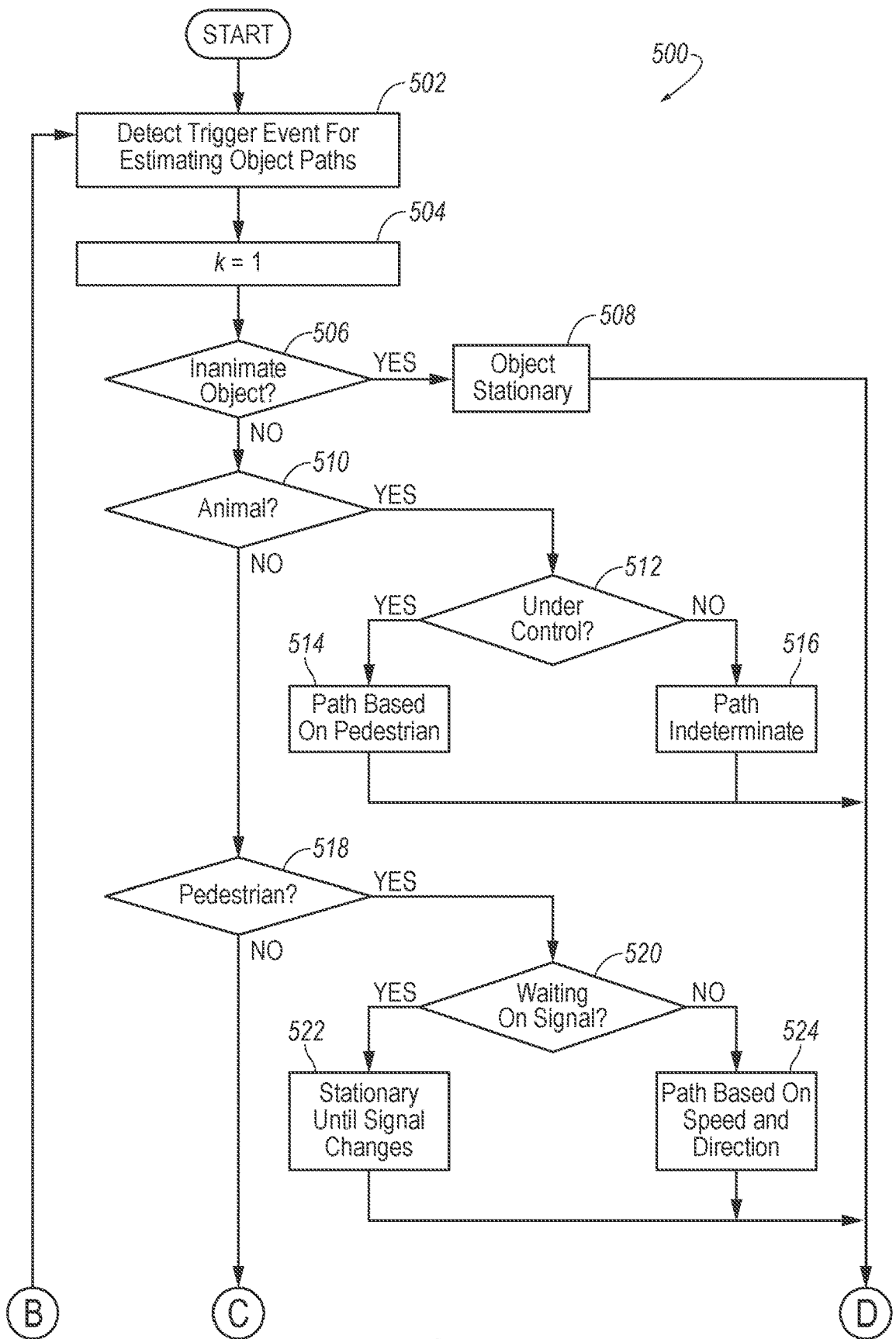
FIGS. 5A and 5B are a diagram of an example process for determining estimated object paths for objects.
Figure 5B:
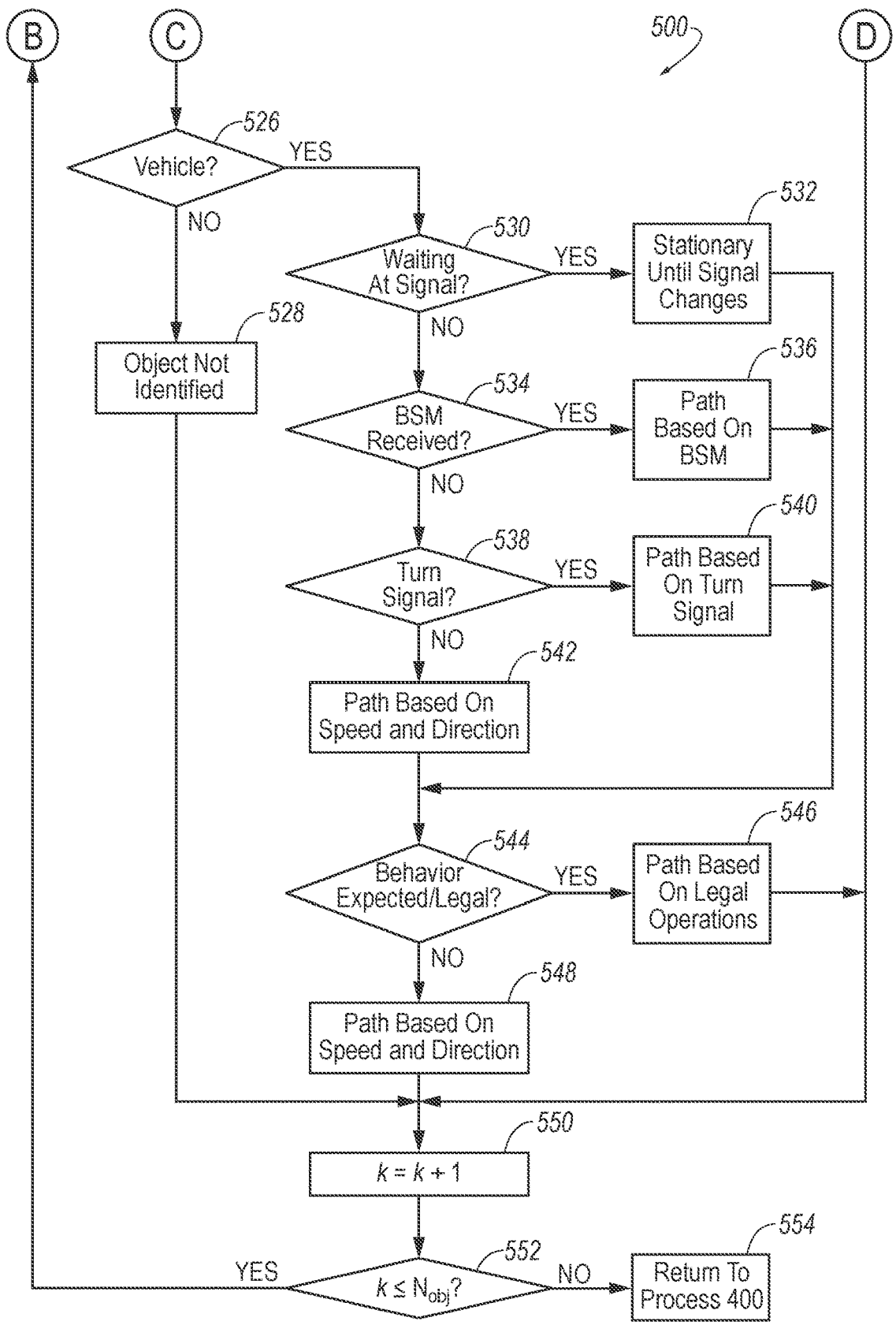

FIGS. 5A and 5b are collectively a diagram of an example process 500 to determine estimated object paths for each object 122 detected to be in the zone 162. This process may operate as a subroutine to the process 400 and be called, for example, from the block 414. The process 500 begins in a block 502.

In the block 502, the computer 112 detects a trigger event to determine estimated object paths for objects 122 detected in the zone 162, i.e., a receipt of data that is specified to initiate estimate the object paths. As non-limiting examples, the trigger event may be a functional call, a digital flag that is set, an interrupt, or other digital signal generated by the process 400, block 414. Upon detecting the trigger event, the process 500 continues in a block 504.

In the block 504, the computer 112 sets an index k=1, where k is an index applied by the computer 112 respectively to each object 122 as it sequences through the objects 122 in the zone 162 to determine an estimated path for the respective $k_{th}$ object. The process 500 continues in a block 506.

In the block 506, the computer 112, based on the object type determination performed in the block 310, determines whether the $k_{th}$ object 122 is road obstruction 122. A road obstruction 122 is a physical structure or body such as traffic barriers, traffic cones, debris, potholes, etc. In the case the $k_{th}$ object 122 is a road obstruction 122, the process 500 continues in a block 508. Otherwise, the process 500 continues in a block 510.

In the block 508, the computer 112, based on the $k_{th}$ object 122 being a road obstruction 122, determines that the $k_{th}$ object 122 is stationary. The process continues in a block 550.

In the block 510, which may follow the block 506, the computer 112, based on the object type determination performed in the block 310, determines whether the $k_{th}$ object 122 is an animal object 122. In the case that the $k_{th}$ object is an animal object 122, the process 500 continues in a block 512. Otherwise, the process 500 continues in a block 518.

In the block 512, the computer 112 determines, based on the object data, collected in the block 304, whether the animal object 122 is under control of a pedestrian object 122. For example, the computer 112 may detect a leash connecting the animal object 122 with the pedestrian object 122. Additionally or alternatively, the computer 112 may detect that the animal object 122 is and remains close to the pedestrian object 122. As a default condition, in case that the determination of whether the animal object 122 is under control of the pedestrian object 122 is inconclusive, the computer 112 can be programmed to determine that the animal object 122 is not under control. In the case that the computer 112 determines that the animal object 122 is under control, the process 500 continues in a block 514. Otherwise, the process 500 continues in a block 516.

In the block 514, the computer 112 determines the object path for the animal object 122 to be a same path as the pedestrian object 122 who is controlling the animal object 122. The process 500 continues in the block 550.

In the block 516, which can follow the block 512, the computer 112 determines that the object path for the animal object 122 is indeterminate, i.e., that it cannot be predicted with a reasonable confidence level.

In the block 518, the computer 112 determines whether the $k_{th}$ object 122 is a pedestrian object 122. In the case that the $k_{th}$ object is a pedestrian object 122, the process 500 continues in a block 520. Otherwise, the process 500 continues in a block 526.

In the block 520, the computer 112 determines whether the pedestrian object 122 is waiting at a traffic signal 140. The computer 112 can determine, based on the speed and direction data whether the pedestrian object 122 is standing still. The computer 112 can further determine, based on a location of the pedestrian object 122 (e.g., standing near a crosswalk 168 or facing a road in a particular direction), and further that the a traffic signal 140 is set such that the pedestrian object 122 is prohibited from continuing across the crosswalk 168 or road in the particular direction that the pedestrian object 122 is waiting on a change of state of the traffic signal 140. In the case the computer 112 determines that the pedestrian object 122 is waiting on the traffic signal 140, the process 500 continues in a block 522. Otherwise, the process 500 continues in a block 524.

In the block 522, the computer 112 determines that the path of the pedestrian object 122 is to remain stationary until the state of the traffic signal 140 changes. The process 500 continues in a block 550.

In the block 524, which can follow the block 520, the computer 112 determines the path of the pedestrian object 122 based on the location, speed and direction of the $k_{th}$ object 122. The computer 112 assumes that the pedestrian object 122 will continue at a same speed and direction as it has been moving. The process 500 continues in the block 550.

In the block 526, which may follow the block 518, the computer 112, based on the object type determination performed in the block 310, determines whether the $k_{th}$ object 122 is a vehicle 122. In the case that the $k_{th}$ object 122 is a vehicle object 122, the process 500 continues in a block 530. Otherwise, the process 500 continues in a block 528.

In the block 528, the computer 112 determines that the $k_{th}$ object 122 cannot be identified. That is, the $k_{th}$ object 122 cannot be classified as one of a road obstruction 122, an animal object 122, a pedestrian object 122 or a vehicle object 122. The process 500 continues in the block 550.

In the block 530, the computer 112 determines whether the vehicle object 122 is waiting for a traffic signal 140. In a case that the vehicle object 122 is stationary in a lane of the road that is currently prohibited from continuing based on a state of the traffic signal 140, the computer 112 can determine that the vehicle object 122 is currently waiting for the traffic signal 140 to change states. The process 500 continues in a block 532. Otherwise, the process 500 continues in a block 534.

In the block 532, the computer 112 can determine that the vehicle object 122 will remain stationary until the state of the traffic signal 140 continues. The process 500 continues in a block 544.

In the block 534, which can follow the block 530, the computer 112 can determine whether a Basic Safety Message (BSM) was received from the vehicle object 122 indicating a future path of the vehicle object 122. In case that computer 112 received a BSM from the vehicle object 122, the process 500 continues in a block 536. Otherwise, the process 500 continues in a block 538.

In the block 536, the computer 112 can determine the path of the vehicle object 122 to be the path indicated in the BSM. The process 500 continues in the block 544.

In the block 538, the computer 112 determines whether a turn signal on the vehicle object 122 is activated. In the case that the turn signal is activated, the process 500 continues in a block 540. Otherwise, the process 500 continues in a block 542.

In the block 540, the computer 112 can determine the path of the vehicle object 122 based on the indication from the turn signal. That is, the computer 112 can determine a direction that the vehicle object 122 will turn at the intersection 166 based on the turn signal. Based on the direction the vehicle object 122 will turn, the computer 112 can project an object path assuming the vehicle object 122 will maintain its current speed, or alternatively estimate an adjusted speed based, for example, on intersection historical data of a typical speed of a vehicle object 122 performing the turn through the intersection 166. The process 500 continues in a block 544.

In the block 542, which can follow the block 538, the computer 112 determines that object path of the vehicle object 122 based on a speed and direction of the vehicle object 122. The computer 112 can assume that the vehicle object 122 will continue at a same speed and direction as it has been moving. The process 500 continues in the block 544.

In the block 544, which can follow one of the blocks 532, 536, 540 or 542, the computer 112 determines whether the vehicle object 122 is operating within an expected range of operation and/or is operating legally. For example, the computer 112 can determine whether the vehicle object 122 is operating at a speed within an expected range. The expected range may be, for example, the speed limit including tolerances when the vehicle object 122 is not impeded by a traffic signal 140 or other objects 122 and may be a lower speed when approaching a traffic signal 140 requiring the vehicle object 122 to stop. The lower speed may be a range of speeds determined based on historical data of vehicle objects 122 that stopped at the traffic signal 140. In the case that the vehicle object 122 is operating legally and within a range of expected operation, the process 500 continues in a block 546. Otherwise, the process 500 continues in a block 548.

In the block 546, the computer 112 determines the object path of the vehicle object 122 based on legal operations. That is, in the case that a state of a traffic signal requires the vehicle object 122 to stop, the computer 112 determines that the vehicle object 122 will obey the signal and stop. If a state of the traffic signal does not require the vehicle object 122 to stop, the computer 112 determines the object path of the vehicle object 122 based on the speed and direction of the vehicle 122. The process 500 continues in a block 550.

In the block 548, which can follow the block 544, the computer 112 determines the object path of the vehicle object 122 based on the speed and direction of the vehicle 122. The process 500 continues the block 550.

In the block 550, which can follow one of the blocks 508, 514, 516, 522, 524, 528, 546 or 548, the computer 112 increments the index k. That is, the computer 112 calculates k according to equation 4.

$$k=k+1 \tag{4}$$

The process continues in the block 552.

In the block 552, the computer 112 determines whether k is less than or equal to the number of objects $N_{obj}$. If k is less than or equal to $N_{obj}$, the process 500 continues in the block 504, and repeats, for the $k_{th}$ object, the process of determining the estimated object path. If k is greater than $N_{obj}$, the process continues in a block 554.

In the block 554, the computer 112 transfers or makes available data generated in the process 500, for example estimated object paths for the objects 122 and indeterminant object paths, to the process 400. The process 500 ends and the process 400 resumes operation at block 416.

As used herein, the term "based on" means based on in whole or in part.

Computing devices discussed herein, including the computers 112, 130, 142 and 152 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic®, Java Script®, Python®, Perl®, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in any of the computers 112, 130, 142, 152 is generally a collection of data stored on a computer readable medium, such as a storage medium, a random-availability memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-availability memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

The processes 300, 400 and 500 are described as being executed by the computer 112 in the roadside infrastructure unit 110. This is only an example and is not intended to be limiting. A portion or all of the processes 300, 400 and 500 may be executed by another computing device such as the server 152, the computer 142 associated with the traffic signal 140, or one or more computers 130 associated with a vehicle 122.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

What is claimed is:

1. A system comprising:
    a roadside infrastructure unit computer including a processor and a memory, the memory including instructions executable by the processor, including instructions to:
    collect object data about each of a plurality of objects within a zone from sensors on a roadside infrastructure unit, wherein the zone includes a road intersection, and the object data about respective objects includes an object type, an object location, an object speed, and an object direction of travel for the respective objects;
    identify a vehicle in the plurality of objects and then determine, based on the object data, an availability level for execution of one or more paths through the road intersection by the vehicle, wherein the availability level for a respective path of the one or more paths is based on a likelihood of interference between any of the objects and the vehicle as the vehicle traverses the respective path; and
    transmit an availability message to the vehicle including the availability level for each of the one or more paths.

2. The system of claim 1, wherein the availability level is selected from a set of availability levels comprising:
    a first availability level specifying that there are no interfering objects for the respective path and the vehicle can proceed at nominal speed;
    a second availability level specifying that there are potentially interfering objects for the respective path and the vehicle can proceed at reduced speed; and
    a third availability level specifying that there are interfering objects present for the respective path and the vehicle should stop and wait.

3. The system of claim 2, wherein the set of availability levels further comprises:
    a fourth availability level specifying that the respective path is closed or blocked and the vehicle should select an alternate path.

4. The system of claim 1, wherein the one or more paths includes one path for each available intersection exit for the vehicle upon entering the road intersection.

5. The system of claim 1, further including instructions to:
estimate respective object paths of the objects based on the object data, wherein determining the availability level is further based on the respective estimated object paths for the objects.

6. The system of claim 1, further including instructions to:
receive signal phase and timing (SPAT) data from a traffic signal operating at the road intersection, wherein determining the availability level is further based on the signal phase and timing data.

7. The system of claim 1, further including instructions to:
receive a basic safety message from at least one of the objects, wherein determining the availability level is further based on second object data included in the basic safety message.

8. The system of claim 7, wherein the second object data includes one or more of the object type, the object location, the object speed, or the object direction of travel.

9. The system of claim 1, further including instructions to:
specify an entry point and an exit point for each path.

10. The system of claim 9, further including instructions to:
specify a recommended speed for each path.

11. The system of claim 1, further including instructions to:
determine a respective confidence level for each of the availability levels in the availability message; and
include the respective confidence levels in the availability message.

12. The system of claim 1, further including instructions to:
identify, based on the object data, respective operating priorities for the objects, wherein specifying the availability level is further based on the respective operating priorities for the objects.

13. The system of claim 1, wherein object data is further collected by stationary sensors having a field-of-view including a portion of the zone and that are communicatively coupled with the computer.

14. The system of claim 1, further including instructions to:
A identify a second vehicle in addition to the vehicle in the plurality of objects;
determine, based on the object data, a second availability level for execution of one or more second paths through the road intersection by the second vehicle; and
transmit a second availability message to the vehicle including the second availability level for each of the second one or more paths.

15. A method comprising:
collecting object data about each of a plurality of objects within a zone from sensors on a roadside infrastructure unit, wherein the zone includes a road intersection, and the object data includes an object type, an object location, an object speed and an object direction of travel for each respective object;
determining, in the roadside infrastructure unit, based on the object data, an availability level for execution of one or more paths through the road intersection by a vehicle wherein the availability level for a respective path of the one or more paths is based on a likelihood of interference between any of the objects and the vehicle as the vehicle traverses the respective path; and
transmitting, from the roadside infrastructure unit, an availability message to the vehicle including the availability level for each of the one or more paths.

16. The method of claim 15, wherein the availability level is selected from a set of availability levels comprising:
a first availability level specifying that there are no interfering objects for the respective path and the vehicle can proceed at nominal speed;
a second availability level specifying that there are potentially interfering objects for the respective path and the vehicle can proceed at reduced speed;
a third availability level specifying that there are interfering objects present for the respective path and the vehicle should stop and wait; and
a fourth availability level specifying that the respective path is closed or blocked and the vehicle should select an alternate path.

17. The method of claim 15, wherein the one or more paths includes one path for each available intersection exit for the vehicle upon entering the road intersection.

18. The method of claim 15, further comprising:
estimating respective object paths of the objects based on the object data, wherein determining the availability level is further based on the respective estimated object paths for the objects.

19. The method of claim 15, further comprising:
receiving signal phase and timing (SPAT) data from a traffic signal operating at the road intersection, wherein determining the availability level is further based on the signal phase and timing data.

20. The method of claim 15, further comprising:
receiving a basic safety message from at least one of the objects, wherein determining the availability level is further based on second object data included in the basic safety message.

* * * * *